United States Patent [19]
Armand et al.

[11] 4,303,748
[45] Dec. 1, 1981

[54] ELECTROCHEMICAL GENERATORS FOR PRODUCING CURRENT AND NEW MATERIALS FOR THEIR MANUFACTURE

[75] Inventors: Michel B. Armand; Michel Duclot, both of Grenoble, France

[73] Assignee: Agence Nationale de Valorisation de la Recherche (ANVAR), Neuilly-sur-Seine, France

[21] Appl. No.: 96,067

[22] Filed: Nov. 20, 1979

[30] Foreign Application Priority Data

Nov. 22, 1978 [FR] France ............... 78 32976

[51] Int. Cl.³ ............................................. H01M 6/16
[52] U.S. Cl. .................................. 429/192; 429/199
[58] Field of Search ............... 429/192, 191, 193, 199

[56] References Cited
U.S. PATENT DOCUMENTS

| 3,749,606 | 7/1973 | De Rossi | 429/192 X |
| 3,773,557 | 11/1973 | Mead | 429/192 X |
| 3,843,400 | 10/1974 | Radford et al. | 429/192 X |
| 4,060,673 | 11/1977 | Dey | 429/192 |
| 4,193,954 | 3/1980 | Speronello | 429/192 X |

Primary Examiner—Charles F. LeFevour

[57] ABSTRACT

Invention concerning an electrochemical generator producing current, the electrolyte 2 of which is constituted by a solid solution of an alkali salt $M^+X^-$ within a plastic, macromolecular material, constituted by homo and/or copolymers essentially with non-cross-linked chains derived from one or several monomers comprising an heteroatom, notably oxygen or nitrogen. The negative electrode is constituted by a material liable to supply an alkali ion $M^+$, and the positive electrode is liable to incorporate into itself the metal M corresponding to the ion $M^+$.

37 Claims, 3 Drawing Figures

ELECTROCHEMICAL GENERATORS FOR PRODUCING CURRENT AND NEW MATERIALS FOR THEIR MANUFACTURE

The invention relates to novel electrochemical generators, of the type of those in which the electrochemical reaction which is the source of electrical current generation brings into play the transfer, by ionic conducting by means of an electrolyte, of cations derived from a negative electrode or "source" of such cations, the chemical potential of which is higher to a positive electrode or "well" for the nonionized species corresponding to this cation and for which the chemical potential is lower. It also relates to novel materials, as well as novel forms of electrolyte and of electrode, notably for the manufacture of such generators.

The invention relates notably to such generators, in which the negative electrode is adapted to supply an alkaline cation at its interface with the electrolyte, the alkaline metal resulting from the discharge of this cation in contact with the positive electrode which is then liable to be incorporated in the physical or molecular structure of the latter.

Generators belonging to this type include those in which the negative electrode is constituted, for example, by an alkali metal such as lithium, sodium or potassium, by an intermetallic compound in which such an alkaline metal is alloyed with another metal, for example, aluminium or silicon, or by an insertion compound of this alkali metal in a receiver material in the crystal lattice into which such alkali metal is insertable.

Various constituent materials of the positive electrode which may be associated in a galvanic chain with a negative electrode such as mentioned above, have also already been described. One may cite, for example sulphur or preferably materials containing a compound, notably a salt of a transition metal conferring on such electrodes a chemical potential naturally lower than that of the negative electrode. Advantageously, one may resort to compounds of this type, with a lamina-structure, capable of dissolving alkali metals, even species corresponding to other types of cations, for example the ammonium cation $NH_4^+$.

Among the latter type of compounds suitable for dissolving alkali metals by forming insertion compounds, may be mentioned so-called "intercalary compounds" of graphite and of a transition metal salt, including notably monomolecular layers of graphite intercalated between layers of a transition metal salt, such as what has been described in French Pat. No. 72 29734 of 18 August 1972.

There are also various electrolytes, more particularly solid electrolytes the use of which has been proposed in such types of generators, in particular complexes or inorganic salts characterized by a conductivity exclusively ionic in character. There may be mentioned for reference for example aluminate compounds containing also alkali ions, such as those known by the name "β-aluminas", the alkali cations of these materials then participating directly in the transfer of charges during the operation of such electrochemical generators.

Generators belonging to this category, whether they are non-rechargeable generators (primary generators), such as batteries, or, more rarely, rechargable generators (secondary generators, such as accumulators) are subject to numerous drawbacks. They are often only capable of producing a satisfactory electrical yield to the extend that their operation is ensured at high temperatures. This is the case for example with sodium-sulphur accumulators which are only suitable for producing satisfactory current densities at operating temperatures above 300° C., temperatures at which the electrode materials are then in molten state. Besides the considerable drawback which is thus represented by this high operating temperature, must be cited the drawback occurring at the level of the containers, boxes or compartments containing the active elements (electrodes and electrolyte) of the generator which must be manufactured by means of sufficiently strong materials, enabling such operating conditions.

It has already been proposed to overcome these difficulties by resorting, for the constitution of the essential elements of these generators, to solid materials remaining in this state during the operation of these generators.

If the construction of such generator elements can then be found to be simplified at the level of the constitution of the enclosures containing them, there remains a considerable difficulty which has hardly been overcome to this day. This difficulty arises from variations in volume that the electrodes may undergo during the functioning of said generators. In particular, the volume of the negative electrode tends, during the discharge, to decrease progressively as its alkali metal content is consumed, at the interface with the electrolyte, whereas on the contrary, the volume of the positive electrode tends, in a large number of cases, to increase, to the extent that the insertion into its lattice of alkali metal atoms is mostly accompanied by a spacing of the crystalline planes of the material which originally constituted the positive electrode. Hence very great difficulties as regards the maintenance of adequate electrical contacts between the electrolyte and the electrodes, at least possible severe polarizations resulted leading to considerable variations in the characteristics of the discharge of the generator. This type of difficulty has been solved in part in generators of the type defined in French Pat. No. 72 29734 above-mentioned. It has, in fact, been indicated that the atoms of alkali metal, at least when they are of small size, may be inserted between the planes of the intercalary compounds which are described therein, without resulting in appreciable modification of the volume of the positive electrode. The mechanical nondeformability of these solid-abstraction naturally being made of the modifications in volume that the negative electrode undergoes during the electrochemical reaction - makes difficult the maintenance of the application of the essential elements of the generator against one another. The difficulty of achieving a continuous and stable surface contact between solid material is added to these difficulties. To attempt to remedy this, it has been proposed to resort to the interposition of a liquide conductive material. One then finds oneself confronted again with the difficulties which can be involved in the retention in position of a liquid constituent between solid constituents.

It is an object of the invention to overcome these drawbacks, at least to a great extent, more particularly to provide electrochemical generators, and preferably rechargeable generators, liable to function in a satisfactory way at low temperatures, notably lower than 100° C., and preferably even lower than 60° C., all the components of which are and remain in the solid state during the functioning and the possible modifications in volume, can be more easily compensated, and in which the risks of breakage of contacts between the electrodes and the electrolyte are considerably reduced, if not eliminated.

The electrochemical generator according to the invention which comprises at least a negative electrode forming a "source" of material having a higher chemical potential, liable to supply an alkali or ammonium cation at its interface with a solid electrolyte and a positive electrode liable to form a "well" having a lower chemical potential for the non-ionized species corresponding to the above-mentioned alkali cation, the electrolyte being of the type of those which enable the transfer of this alkali cation, when applying to ionic conduction, from the negative electrode to the positive electrode, when the electrochemical reaction occurring because of the production of current takes place, is characterized by the fact that the solid electrolyte is constituted at least in part by a solid solution of an ionic compound entirely dissolved within a solid macromolecular material within a solid plastic macromolecular material:

said ionic compound having the following formula $M^+X^-$, in which M is a cation derivative of an alkali metal or is the ammonium ion, this cation corresponding at least in part to the cation liable of being supplied by the negative electrode at its interface with the electrolyte and $X^-$ is an anion of a strong acid;

said macromolecular material being constituted at least in part by one of several homo and/or copolymers derived from one or several monomers comprising at least an heteroatom, notably oxygen or nitrogen, liable to form donor-acceptor type bonds with the cation $M^+$.

Preferably the above said solid and plastic macromolecular material is also thermoplastic and essentially constituted by non cross-linked homopolymer or copolymer chains.

The preferred materials according to the invention can easily be manufactured into thin sheets, for instance by hot rolling in the molten state or by deposition on a support, through evaporation of the solvent from the solution which they form in organic solvents or solutions of their basic constituents, that is to say of the macromolecular material and of the $M^+X^-$ salt, in a common solvent, such as methanol or acetonitrile.

One also naturally resorts to macromolecular materials having a molecular weight sufficient to present the required plastic characteristic. These properties are generally acquired for molecular of about 50 000, it being understood that this value is only an indication.

In practice, this molecular weight will be far higher, for instance higher than 3 000 000.

The solid electrolytes thus obtained are essentially free from humidity, in other words essentially anhydrous.

The invention profits by the mechanical qualities of the plastic materials with high molecular weight which are thus obtained.

These electrolytes can be constituted by extremely thin sheets, as it will be further explained in the examples.

These plastic materials also possess properties proper to usual plastic materials, notably the possibility to submit progressive variations of the viscosity according to the temperature.

In this respect, the plastic materials of the invention are different from the low molecular-weighted waxes which undergo discontinuous melting, that is to say strength forward and discontinuous passage from said state into liquid state at fixed temperatures. They are also different in this respect from classical gels which can be inflated by solvents in important proportions. Preferably the plastic materials according to the invention can not be inflated, notably in water.

The electrolyte materials resorted to in the present invention are genuine solid solutions of the above-defined mineral salts in the plastic material, essentially in the absence of any solvent.

One of the object of the invention is then to propose a generator, the solid electrolyte of which presents a plasticity making the compensation of the variations of the volume of the electrodes easier as well as adhesion qualities at the level of its interfaces with the electrodes, more particularly when they remain solid during the functioning of the generator.

Moreover, such generators are liable to function in a satisfactory way, at far lower temperatures, notably lower than 150° C., preferably at 100° C., even at 60° C. which represents a considerable advantage in all above-mentioned respects.

Advantageously, the macromolecular material applied to in the constitution of the above-mentioned solid solutions is, at least in part, constituted by homo or copolymers containing chains comprising at least an heteroatom of oxygen or nitrogen, by 4 preferably even 2 carbon atoms of the said chains, these heteratoms either participating directly in the formation of the said chains, or being directly linked, but laterally, to carbon atoms of a chain constituted by a homogeneous sequence of carbon atoms, in the ratio of one heteroatom to 4, preferably to 2 carbon atoms.

In the first case, the heteroatoms are intercalated between the neighbour carbon atoms of the chains.

In the second case, they are responsible for the lateral bonds with respect to the carbon atoms of the said chains.

In the last case, the free remaining bonds of the heteroatoms, can eventually be engaged in a bond with lateral groups or chains.

The electrochemical generator according to the invention is characterized in that its electrolyte is essentially constituted by a solid solution and by an ionic compound completely dissolved in a macromolecular material, preferably heat-formable, and in which:

the ionic compound has the formula $M^+X^-$, in which M is a cation derived from at least one alkali metal, or the ammonium ion, and $X^-$ an anion of a strong acid, the macromolecular material includes in part or in totality homo and/or copolymers, essentially with non-cross-linked chains, derived from one or several monomers including a heteroatom, notably oxygen or nitrogen, which is adapted to form bonds of the donor-acceptor type with the cation $M^+$.

The invention therefore provides a generator, the solid electrolyte of which has a plasticity making compensation of the variations in volume of the electrodes easier, and with adhesion qualities at the level of its interfaces with the electrodes, more particularly when the latter remains solid during the functioning of the generator, which are not possessed by conventional solid electrolytes.

Moreover, such generators are liable to function satisfactorily at much lower temperatures, notably lower than 150° C., preferably lower than 100° C., even lower than 60° C., which represents an undeniable advantage from all the points of view already mentioned above. The macromolecular materials which are particularly fit for the production of such solid electrolytes are those derived from monomeric units of the type shown
either by the following formula:

in which R' represents a hydrogen atom or one of the groups Ra, —CH$_2$—O—R$_a$, —CH$_2$—O—Re—Ra, —CH$_2$—N=(CH$_3$)$_2$ with Ra representing an alkyl or cycloalkyl radical comprising notably 1 to 16, preferably 1 to 4 carbon atoms, Re representing a polyether radical of the general formula —(CH$_2$—CH$_2$—O)$_p$—, p having a value from 1 to 100, notably from 1 to 2,
or by the following formula:

in which R" represents Ra, —Re—Ra, with Ra and Re having respectively one of the above-indicated meanings, or by the following formula:

in which Ra and Re have respectively one of the above-indicated meanings.

A first type of suitable macromolecular material is constituted by a poly(ethylene oxide), which may be shaped by a thermoforming technique at a temperature, for example of 200° C. As will be seen from the examples described below, poly(ethylene oxide) already constitutes a macromolecular material which may be used with great advantage for the constitution of generators according to the invention, in spite of its tendency to form crystalline structures which, at least for certain relative concentrations of alkaline salts, is of a nature to make the homogenous diffusion of the latter within said poly(ethylene oxide) more difficult.

A preferred category of macromolecular materials—which are also new— used for the constitution of the electrolyte according to the invention is formed by amorphous and consequently isotropes elastomers which belong to the general class defined above and which are derived from monomeric units of the type shown
either by the following formula:

in which R' represents one of the groups Ra, —CH$_2$—O—R$_a$, —CH$_2$—O—Re—Ra, —CH$_2$—N=(CH$_3$)$_2$, with Ra representing an alkyl or cycloalkyl radical comprising notably 1 to 12, preferably 1 to 4 carbon atoms, Re representing the polyether radical of the general formula —(CH$_2$—CH$_2$—O)$_p$—, p having a value from 1 to 10,
or by the following formula:

in which R" represents Ra, —Re—Ra, with Ra and Re having respectively one of the above-indicated meanings,
or by the following formula in which
Ra and Re have respectively one of the above-indicated meaning The properties of elasticity, amorphism and isotropy of these latter materials contrast with the crystallinity of the poly (ethylene)oxide complex such as described in an article of Peter V. Wright in "Br. Polym. J"1975,7, 319–327, titled "Electrical Conductivity in Ionic Complexes of Poly (ethylene oxide)". It is recalled that this author has incorporated certain salts to poly(ethylene oxide) with high crystallinity degree, in order to study the behaviour of the polymer-salt complex obtained, with high crystallinity, notably in the neighbourhood of its transition points The amorphous character of these materials can be evaluated notably by X-ray examination. Their X-ray diagram is limited to a diffuse background including in the most unfavorable cases extremely wide strips, unlike a more crystalline macromolecular material, such as poly(ethylene oxide), the X-ray difraction diagram of which shows relatively distinct strips showing a crystalline organization which may be relatively extensive, the crystals of which can occupy up to 80% of the volume of the mass.

The amorphous character can also be evaluated by the transparency for at least certain of the materials concerned, for example, poly(propylene oxide) unlike poly(ethylene oxide) which is translucent.

The electrolytes constituted with such elastomers then benefit from the additional advantage which consists in the compensation, at least in part, of the variations in volume of the electrodes during the charging or discharging of the corresponding generators, due to their own capacity, as the case may be, to undergo compressions or expansions.

The diffusion of the alkali salt M$^+$X$^-$ in such amorphous materials can also be revealed more easily and this can be done, whatever the relative proportions of the two materials, and the solid solutions thus formed are fit for thermoforming, notably by rolling, at temperatures which may be lower, for example about 150° C. for solid solutions based on pol (propylene oxide).

It is no use saying that the proportion of alkali salt with respect to the macromolecular material must not normally exceed the maximum solubility limit, beyond which two distinct phases would then be formed. Precipitations of the alkali salt would result therefrom within the macromolecular material, precipitation which would alter the ion-conductive properties of the electrolytes thus constituted, notably by the formation of zones or points which are non- or difficultly-conductive. The maximum theoretical proportion (which can not always be reached with a certain number of the alkali salts which can be used) of the alkali salt with respect to the macromolecular material corresponds to a ratio of the number of heteroatoms (oxygen or nitrogen) to the number of alkali atoms equal to 4. This number 4 corresponds in fact to the maximum of alkali cations $M^+$ liable to be solvated by the free electron doublets of the abovesaid heteroatoms. In practice, this ratio is comprised between 4 and 30. The higher conductivities are generally observed for values of this ratio which are situated between 4 and 20, it being understood that this number 20, as well as the number 30 mentioned above, do not constitute critical limits beyond which corresponding solid solutions would depart from the scope of the invention. It will naturally be obvious for the technician that the use of decreasing proportions of the alkali salt with respect to the macromolecular material, appearing consequently by an increase in the value of the abovementioned rat could result in a reduction of the conductivity of the materials concerned.

Advantageously, the ratio of the number of carbon atoms to the number of heteroatoms in the macromolecular material itself is as low as possible, notably comprised between 2 and 18, preferably from 2 to 3, taking into account the interest of having a maximum number of these heteroatoms—by reason of their solvating action with respect to the above-defined $M^+$ cations - per unit volume of the electrolyte material.

As regards particularly the anion of the salt $M^+X^-$ used for the constitution of the solid electrolyte, it is advantageously characterized by an anionic radius equal to 1.81 A (ionic radius of the chlorine anion) or preferably higher than this value. In this respect, the iodine ion ($I^-$) is preferred. It is more particularly still the same as regards the anions constituted by complex molecules, in which the negative charge is divided between several atoms. It is also to be noted that, at least as regards the acids which are stable in aqueous medium, their strength is substantially equal to, or preferably greater than, that of the hydrochloric acid.

As regards the $M^+$ cation, it is understood that it can cover several distinct metallic species, in which case the salt concerned becomes a mixed salt of several metals, it being obviously understood that the sum of the positive charges of these various cations must balance the negative charges carried by the anions. An example of such a mixed salt is $(Li_{0.5}K_{0.5})SCN$. The same observation is naturally extendable to the salts of the type $M^+X^-$, in which several anions of distinct chemical structures could be part thereof.

It is advantageous to resort to cations derived from lithium or from sodium, to the extent where the latter have small volumes enabling their easier solution in the positive electrode material, and with a possible reduced deformation of the latter. This is not however a critical condition, because one can also use other alkali cations in an advantageous way. Solid solutions resorting to ammonium ions $NH_4^+$ can be used for the constitution of an electrochemical generator comprising the galvanic chain:

$\frac{1}{2}H_2 + NH_3$/electrode which transports $NH_4^+/MoO_3$.

Preferred anions are selected from among the following:

$SCN^-$, $ClO_4^-$, $BF_4^-$, $PF_6^-$, $AsF_6^-$, $CF_3CO_2^-$, $CF_3SO_3^-$.

Preferred solid solutions according to the present invention comprise salts whose cation is derived from lithium or sodium atoms and whose anion is selected from among $I^-$, $SCN^-$, $ClO_4^-$, $BF_4^-$, $PF_6^-$, $AsF_6^-$, $CF_3CO_2^-$, $CF_3SO_3^-$ Another category of preferred solid solutions is that in which the anion of the ionic compound is selected from among the following anions:

$SCN^-$, $PF_6^-$, $AsF_6^-$ and $CF_3SO_3^-$ and the cation from among the following cations:

$Li^+$, $Na^+$, $K^+$, and $NH_4^+$.

Yet another advantageous category of solid solutions is that in which the anion of the ionic compound is $PF_6^-$ or $AsF_6^-$ and the cation $Rb^+$ or $Cs^+$.

Generally advantageous compounds according to the invention are those which have ionic conductivities higher than $10^{-5} \Omega^{-1}.cm^{-1}$, preferably at temperatures below 150° C., and more particularly lower than 100° C., even then 60° C. or even at ambient temperature, especially in the case where very thin electrolytes are used.

In fact, an important additional advantage of the invention resides in the fact that it is possible with the materials concerned to manufacture extremely thin electrolyte sheets of about some hundredths of a millimeter, from 1 to 20 hundredths of a millimeter or even thinner, notably from 1 to 3 hundredths of a millimeter.

It is to be noted that the electrolyte plays essentially in the generators according to the invention, a role of cation carrier of the negative electrode towards the positive electrode in the absence of any separator. The electrolyte can thus be very thin, notably far thinner than the electrodes with which it is associated. The thickness of the electrolyte can be for instance lower than 30%, even than 10%, of the thickness of associated electrodes. These possibilities of extrem thickness, which result from the mechanical and plastic qualities of the electrode materials can enable an important increase in the voluminal capacity of the generator elements thus constituted.

As regards the preparation of the solid solutions of the ionic compound $M^+X^-$ and of the above-defined macromolecular compound, it is possible, for example, to proceed by the dissolution of the ionic compound and of the polymer in a common solvent such as methanol or acetonitrile. Another method of preparing the abovesaid solid solutions consists in grinding a mixture of the macromolecular material and of the ionic compound, and in melting the mixture at a temperature about equal to or higher than that of the polymer and malaxating it when it is hot, to the extent necessary for the formation of the solid solution.

The relative proportions of the basic constituents which can be used in this process substantially correspond to those which are desired in the final product. Preferably, at least one mole of the ionic compound per kg of macromolecular material will be used, the proportions which are however not exceeding those corresponding to the solubility limits of the ionic compound in the macromolecular material.

In accordance with an additional feature of the invention, it is also possible to incorporate with the electrolyte thus formed, constituents exclusively for ionic conduction such as β-alumina with lithium, sodium or potassium, mixtures of lithium and aluminum iodides[-LiI(Al$_2$O$_3$) or double silica-phosphate of zirconium and sodium Na$_3$ZR$_2$ PSi$_2$O$_{12}$ or double germanate of zinc and of lithium such as Li$_{14}$ZnGe$_4$O$_{16}$], which can have the effect of improving further the ionic conductivity characteristics of the composite electrolyte thus obtained.

Advantageously, this incorporation consists in malaxating together a solid solution with the powder of these inorganic materials or in subjecting to evaporation a suspension of these inorganic materials in a solution in an organic solvent such as above contemplated, either of the solid solution with ionic conduction, or of the constituents from which it can be formed. The relative proportions of each of these types of constituents may be any, those of the exclusively inorganic ionic conductor not however exceeding those for which the composite materials obtained could not be rolled into sheets or would not have the desired mechanical strength. The proportion of the inorganic or exclusively inorganic constituent. The proportion of the inorganic or exclusively inorganic constituent possessing ionic conduction could nonetheless reach 90% by weight of the total weight, preferably 50 to 80%. Without the values being interpretable as having a critical value, recourse is advantageously had to powdered inorganic materials of this type having a granulometry of about 0.1 (or even less) to 500 μ, preferably 0.1 to 10 microns, notably in the case where the composite material obtained is intended for the manufacture of very thin sheets or films of electrolyte.

Particles of a non-conductive inert powder can also be incorporated into the electrolyte material. These particles then determine the minima thicknesses liable to be obtained during rolling operations because of their granulometry.

It is not necessary to dwell upon the manufacturing processes of the salts to be used, playing the role of the ionic compound. In the same way, the macromolecular materials are easily available.

Certain of the monomers or corresponding polymers are available commercially or can be manufactured by known techniques. For example, may be mentioned among monomers corresponding to the polymers (homopolymers or copolymers) comprising units of the type R' having the above-mentioned meaning, those which are commercially available, in particular those in which R' represents H, CH$_3$, C$_2$H$_5$, HC=CH (vinyl), C$_{12}$H$_{24}$, C$_{12}$H$_{22}$ (cyclododecane), C$_{14}$H$_{30}$, C$_6$H$_5$ (phenyl) or in which R' represents CH$_2$-O-Ra, Ra belonging to the following category of radicals: CH$_3$, C$_2$H$_5$, C$_3$H$_7$ (n propyl and isopropyl), C$_4$H$_3$, C$_5$H$_{11}$, C$_6$H$_{13}$, C$_8$H$_{17}$, C$_{12}$H$_{25}$, C$_{16}$H$_{33}$, C$_6$H$_5$ (phenyl), CH$_3$C$_6$H$_4$ (ortho, meta or para tolyl).

The corresponding macromolecular materials can be obtained by homopolymerization or copolymerization of the corresponding monomers by known techniques, for example by means of catalysts, such as are described in American Pat. Nos. 3,728,320 and 3,728,321.

The macromolecular materials belonging to the category of the above-mentioned materials and derived from the following monomeric unit:

are obtained by polymerization of epichlorhydrine and treatment of the polymer obtained by dimethylamine or, preferably, lithium dimethylamide within a solvent of the polymer, for example tetrahydrofurane.

The category of macromolecular materials derived from the monomeric units of the type represented by the formula R'' having the above-mentioned meaning, is obtained for example by the polymerization of the aziridines, notably in the presence of the catalyst mentioned in the following publications: W. G. Barb, J. Chem. Soc. 2577 (1955), Farbwerke Hoechst A. G. Ger. Off. 914,325 (1949), etc.

The category of macromolecular materials derived from monomeric units of the type represented by the formula:

Re, Ra having the above-mentioned meanings, is available commercially when Re represents CH$_2$—CH$_2$—O and Ra the methyl or ethyl radical, and when Re represents (CH$_2$—CH$_2$—O—)p, p varying from 2 to 4 and Ra representing the methyl radical.

The other materials of the abovesaid category are available by synthetic routes described for example in "Encyclopedia of Polymer Science and Technology", vol. 14, p. 504, edited by Interscience Publishers, New York, or in American Pat. No. 2,311,567.

To prepare the electrolyte itself, for its incorporation in an electrochemical generator, may be mentioned notably the application of one or other of the processes already mentioned above for the manufacture of the material itself.

Starting for example, from a solution of the macromolecular materials and metallic salts chosen, the latter may be cast on a plate, the solvent being then removed by evaporation in the oven, for example at a temperature of about 50° C. After drying, a film is obtained which can be detached from the support, the latter being advantageously constituted by a non-adherent material for this purpose, such as polytetrafluorethylene. It is obvious that the thickness of the thin film obtained will be a function of the amount of starting material used in the solution.

The support concerned can also be constituted by one of the electrodes, notably the positive one, with which the electrolyte thus formed must be associated in the final generator. The negative electrode in its turn, in particular when it is constituted with sodium or with a low melting point alloy, can be formed by casting on the free surface of the electrolyte sodium or the alloy in the liquid state and by cooling the layer thus formed, of course in an inert and anhydrous atmosphere. It is obvious that any other production method for the element of a generator may be contemplated. It is also possible to proceed by simple stacking of thin films of the electrode materials on the two opposite surfaces on a previously formed electrolyte film.

Generally, and more particularly in "all solid" generators of these secondary rechargeable type, recourse may be had for the constitution of the negative electrode to any compound capable of releasing an alkali ion at its interface with the solid electrolyte, hence showing a reduced electronic affinity with respect to the corresponding alkali metal. It is hence possible to use the metal itself, metallic compounds or alloys containing it and in accordance with the above-mentioned condition, for example, alloys of lithium and aluminum or of silicon, sodium or arsenic. In the same way, recourse may be had to insertion compounds of this alkali metal in a receiver material, in the crystalline lattice of which it can be inserted. Recourse may be had notably to compounds of notably laminar structure, enabling the insertion of these alkali atoms into their structure, the intercalary compounds being selected from among those which have themselves a chemical potential close to that of the alkali metal. By way of example of insertion compounds obtained, may be mentioned those of graphite, such as those of the general formula $LiC_6$, $KC_8$, etc., or mixed compounds of these alkali metals with aluminum borides. It is obvious that these enumerations have no limiting character and that it is possible to use advantageously any insertion compound containing the alkali metal and whose global chemical potential will only be distinguished at the most moderately from that of the pure alkali metal. Preferably, those insertion compounds will be selected among compounds whose chemical potentials are not lower than more than 0.5 electrons-volts (eV) with respect to that of the alkali metal.

On the other hand, it is advantageous to resort for the positive electrode, to any mixed compound or intercalary compound comprising compounds or salts of an alkali transition metal possessing a high electronic activity with respect to alkali metals and liable to impose on the latter, when they are in the ionized state, a low chemical potential with respect to the one they have when they are in the metallic state. The difference between the two chemical potentials thus considered is advantageously equal to or greater than 2.3 eV, for example of the order of 3 eV.

As transition metals that are advantageously used in the positive electrode, may be mentioned titanium, vanadium, chromium, manganese, iron, nickel, cobalt, copper, niobium, tantalum, molybdenum, etc.

As non-limiting example, may be mentioned among the compounds corresponding to conditions of this type, the intercalary compounds of graphite and of a salt of a transition metal, which can accept the insertion into their structure of certain proportions of alkali atoms, such as described in French Pat. No. 72 29734 already mentioned above. To this type of compound, is attached for example graphite-transition metal salt compounds, such as graphite-$NiCl_2$.

As other examples, of course non-limiting, may also be mentioned:
the dichalcogenides of transition metals, such as $TiS_2$, $NbSe_2$, etc.,
the oxyhalogenides of transition metals, for example $FeOCl$, $CrOBr$, etc,
the halonitrides of transition metals, for example $TiNCl$, $ZrNCl$, $HfNBr$, etc.,
Of course these materials may already comprise certain proportions of alkali metal pre-inserted in their respective structures, of course, below the saturation level.

In accordance with a further preferred characteristic of the invention, which can be used independently from the generator according to the invention, one at least of the electrodes is modified by the incorporation in its mass of a material formed by a solid solution of the same nature as that of the electrolyte, preferably the same. The electrode can then also be considered as a product of agglomeration in a composite mass, preferably substantially homogeneous, of the electrode material, notably of the active material of the latter and, as the case may be, of at least one compound inert to electronic conduction facilitating the transfer of electrical charges to an external conductor, on the one hand, and from said solid solution, on the other hand.

These electrodes, constituted by a material with both ionic and electronic conduction, are particularly fit for the formation of a generator electrode of the "all solid" type, the electrode thus formed being itself liable, due to the plasticity which is then conferred on it by its macromolecular constituent, to be better adapted to the variations in volume and size for which it itself and possibly other constituents of the generator can be responsible during the functioning of the generator, whether during the charging or the discharging, in the case of a secondary generator. There are as well produced electrodes, the surface of which have equally improved proper ties of adhesion and adaptation, for example to the surface of the solid electrolyte which can be associated with it.

This is even more particularly the case when the macromolecular material is selected from among those which have also in addition to the above-mentioned plasticity, elastic properties enabling the electrode assembly to correct itself, at least in part for the variations in volume that its own content of active material can undergo during the functioning of the generator.

In addition, the incorporation of the ionic conducting solid solution in the mass of the electrode has the effect of extending the electrochemical reactions throughout the whole mass of the electrode at the level of the grains of particles of active material, in contrast to conventional generators in which the electrochemical reactions are essentially limited to the interfaces between electrolyte and electrodes. The improvement in the transfers of ionic charge of the electrolyte to the electrodes can result in a relative decrease in the functioning temperature of the generator. Preferably, the granulometry of the particles of active material and, as the case may be, of the one or more auxiliary inner electronic conductors and possibly other charges is situated between about 1 and about 300$\mu$, for example from 10 to 100$\mu$. In the case of an active material whose own ionic conduction is relatively low, it may be advantageous to reduce the above-indicated granulometries to smaller values. It may be noted that the solid solution incorporated also plays the role of the binder with respect to the other constituents of the electrolyte.

An additional advantage of the incorporation of the solid solution in the electrode or of the above-mentioned agglomeration is manifested when recourse is had to an active material which must be protected from the external atmosphere. Such as, for example, —as regards notably the positive electrode- the case of sodium, which must naturally be handled in the total absence of moisture and of oxygen. This condition is not eliminated due to the fact of the incorporation of the sodium in the state of grains or of powder in a macromolecular material with ionic conduction of the type described. It is however made less rigorous, hence easier manipulation of these materials than that of the pure metal.

The agglomeration in a composite mass of the abovesaid solid solution and of the other constituents of the electrode is also particularly advantageous in the case where recourse is had to electrode materials having mechanical properties making them unsuitable for forming under predetermined volumes. This is for example the case for the electrode material constituted by an alloy of aluminium and of lithium which, taken alone, has very little ductility.

The proportions of solid solution and of electrode material may vary to a large degree. Preferably, the proportion of solid solution does not however exceed 25% by weight, although this value does not in itself have a critical significance. The specialist will appreciate however that it is not advantageous in practice to increase the proportion of the solid solution in the electrode too much for the simple reason that as a result there is a concomitant reduction in their electrical capacity.

The thus-modified electrodes may be obtained by intimate mixing or malaxing of the constituents then in the powdered state of the electrode material, on the one hand, and of the solid solution, on the other hand, which operation may be followed, if necessary, by heating to produce the fusion of the particles of solid solution, with, as a corollary, better adhesion of the particles of the material of the electrode between each other. It is again also possible to proceed by the suspending of the powdered electrode material within a solution in an organic solvent for the material constituted by the abovesaid solid solution or of the constituents from which they can be formed, in this case, the macromolecular material, on the one hand, and the salt $M^+X^-$, on the other hand, and by evaporation of the solvent under similar conditions to those which have already been described with respect to the preferred methods of preparing the electrolyte of the generator according to the invention.

The improved electrodes which have been described can also, because of their proper qualities of plasticity, more particularly of thermo plasticity and, in some cases of elasticity, (when it is resorted to isotrop, amorph, macromolecular materials, above defined) can also be suitable so as to be used in electrochemical generators applying to classical electrolytes, more particularly solid electrolytes, for instance those which are essentially constituted by inorganic ionic conductors, such as here above described.

The invention hence enables easy forming of the electrodes, notably by casting a suspension such as defined above on a support, for example, of polytetrafluoroethylene.

The compositions, with both electronic and ionic conduction thus obtained, which are suitable for the direct manufacture of electrochemical generator electrodes, therefore have also the additional advantage of easy and economic industrial production of electrodes of large surface area. In fact, the plasticity of these compositions enables the forming of the electrodes concerned, notably by rolling. A large variety of configurations can be contemplated. It is possible thus to produce elements of electrochemical generators by simple stacking of sheets or films, respectively of electrolyte and of the corresponding electrodes, which stacked elements can, if necessary, be rolled into a spiral according to the conventional methods applied for example to the manufacture of dielectric capacitors.

In a particularly advantageous embodiment of the invention, recourse is had to the same solid solution for the constitution of the electrolyte and of the material of incorporation into the electrodes, so as to constitute generator elements in which this solid solution extends substantially continuously from the electrolyte to and into the abovesaid electrodes, so that contact qualities are found to be established which remain intimate during all the operations that this generator element performs (charging or discharging) between the electrolyte and the electrodes. Such generator elements can be obtained, for example, by formation in a suitable order of successive films of electrodes, on the one hand, and of the electrolyte, on the other hand, by resorting, for example, to the technique above mentioned consisting, as the case may be, of forming these films:

either by deposition on a support, preferably nonadherent or on the previously formed film of electrolyte, of a suspension of electrode material in a solution of the material intended to form the abovesaid solid solution or of the constituents necessary for obtaining the latter, as far as the manufacture of electrodes is concerned;

or by the deposition notably on a previously formed electrode film of the abovesaid solution alone, followed by the evaporation of the solvent, as far as the formation of the electrolyte film is concerned.

It will naturally be obvious that generator elements having similar characteristics can also be obtained by resorting to other procedures, notably by the separate formation of films of electrodes and of electrolytes, these films being then combined with one another by contact, for example, by hot pressing at a temperature enabling the softening of said solid solution.

The invention consequently enables the manufacture of rechargeable current producing generators, the different constituent elements of which can be extremely thin. By way of example, it is possible notably to produce any extremely thin generator elements utilizing, for example, films or sheets of electrolyte having a thickness comprised between about 0.01 and about 0.2 mm and sheets or films of electrodes having thickness of 0.1 to 0.5 mm. It is obvious that such indications are only by way of examples which are not to be interpreted as limiting the scope of the invention. The assemblies thus formed must naturally, in particular in the case where recourse is had to moisture-sensitive compounds, be isolated in perfectly fluid-tight boxes or compartments. If necessary, the different parts of each generator element (electrolyte and electrodes of opposite signs) are held clamped against one another by resilient or elastic means, if necessary with an additional sheet of an elastomer adapted to absorb possible variations in volume to which the electrodes may be responsible for in the course of the operation of the generator.

In the case when one resorts to macromolecular materials of the elastomeric type for the consitution of the electrolyte and possibly for incorporation into the electrodes, the use of these resilient means may turn out to be unnecessary, to the extent that certain at least of the essential components of each generator element can be capable of compensating for the variations in volume by themselves, due to their capacity of expansion or of compression as the case may be. It may be advantageous to provide dimensions for the boxes, notably in the direction of thickness, corresponding to those of the sums of the thicknesses of these constituents at the normally minimum value that they would take in the absence of compression exerted on opposite outer surfaces of the assembly formed by said constituents. Of course, the various elements may be connected in series, in order to obtain power generators having high performance.

The invention is applicable in all fields where the production of electrical energy is sought, whether in the field of microelectronics, of generators of very low power but capable of functioning for considerable periods, such as for example, the batters of cardiac stimulators or "pacemakers", or in the field of electrical traction or applications bringing into play considerable transfers of electrical current (delivery or storage of energy), for example in the domain of the smoothing of power curves of electrical generating stations (storage of energy during hollow hours hours and large amounts of energy delivered to the electrical mains during peak hours).

Other characteristics and advantages of the invention will also appear in the course of the description which follows of embodiments establishing the possibilities of application of the invention. These examples have only, of course, an indicative and non-limiting value. Reference will also be made to the drawings, in which.

EXAMPLE I:

This example relates to the manufacture of a generator.

The solid electrolyte is constituted by a solid solution of sodium iodide NaI in poly (ethylene oxide). It is obtained by dissolving 3 g of poly (ethylene oxide) of molecular weight 5,000,000 in 100 ml of methanol, to which 2.5 g of sodium iodide is added. A portion of the solution obtained is then cast on to a polytetrafluorethylene plate and to a thickness of 5 mm. The solvent is removed in the oven at 50° C. After complete drying, a plate is obtained having a thickness of about 0.02 mm.

The positive electrode is formed from 75% by weight of titanium sulphide $TiS_2$, 10% by weight of graphite powder and 15% by weight of the above-described electrolyte. It is obtained by casting on to a plate of politetrafluorethylene of dimensions similar to that of the preceding one of a suspension of the components of the electrode in methanol or acetonitrile, followed by the evaporation of the organic solvent. The electrode film obtained has a thickness of about 0.3 mm. The thin films of positive electrode and of electrolyte are then placed in contact by hot pressing at 150° C. and the negative electrode is obtained by casting very pure liquid sodium, to a thickness of 2 mm on the solid electrolyte.

Figure 1:
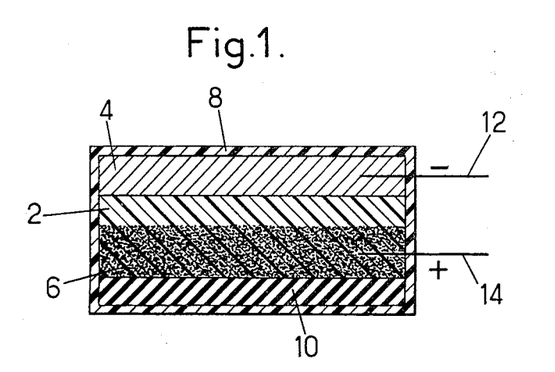
FIG. 1 is a diagram of the principle of a rechargeable secondary generator element applying the teachings of the invention.

The electrolyte and the two electrodes of opposite signs of such a generator element are marked in the drawings by the references 2, 4 and 6 of FIG. 1. They are enclosed in a sealed box 8. An elastic sheet 10 contributes to maintaining the essential constituents of this generator element applied against one another. This necessity of applying against one another the essential constituents of the generator which can be achieved even in the absence of such elastic means, in the case when the electrolyte itself is constituted with an elastomeric macromolecular material, is, in the present example, required especially at the interface of the sodium electrode 4 and of the electrolyte 2. This application of one of the constituents against the other is less necessary between the electrode 2 and the positive 6, to the extent that the ionic material of the electrolyte 2 is extended in a way towards the electrode 6 due to the fact of the content of the latter of the macromolecular ionic conduction material which is incorporated in it. The sealed box naturally allows a passage for leads electrically connected to the electrodes respectively denoted at 12 and 14 and which may themselves be connected to an external circuit (not shown).

The generator thus obtained has the following characteristics: the maximum electromotive force is 2.6 volts and the intensity of the current delivered into a resistance of 10 kilo-ohms, for a surface of 1 cm 2 of electrode, is 0.2 mA. It is noted that these results are obtained with an electrolyte whose conductivity is of the order of $10^{-5} \, ohms^{-1} \cdot cm^{-1}$ at a temperature of 45° C.

EXAMPLE II:

It is possible, under the same conditions, to produce an electrochemical generator of this type by resorting to a sheet of electrolyte prepared in the following manner.:

1 g of poly (propylene oxide) having a molecular weight of the order of 100,000 is dissolved in 30 ml of acetonitrile and to the solution obtained is added 448 g of lithium trifluoromethanesulphonate. From this solution, a film of solid solution is obtained, by operating under the same conditions as in example I. This material has a conductivity of $10^{-5} \, ohms^{-1} \cdot cm^{-1}$ at a temperature which is of the order of 45° C. A generator utilizing this material is hence capable of producing satisfactory electrical yields already at such a functioning temperature. These yields can only be improved by working at slightly higher temperatures, but remaining very compatible with the thermal resistance characteristics of conventional materials for producing generator boxes or compartments. It is thus, for example, for moldable materials such as polyethylene, polypropylene or polystyrene, whose softening temperatures are situated at about 100° C.

EXAMPLE III:

In the same way, generators capable of functioning at temperatures which are not very high are produced by resorting to solid solutions whose constitutions and certain of their electrochemical characteristics are indicated in Table I below. All these solid solutions have been produced by the process described in example I, naturally applied with corresponding proportions of the macromolecular material, on the one hand, and of the ionic salt on the other hand.

In this table, PEO denotes poly (ethylene oxide), PPO poly (propylene oxide), the figure opposite the components of the solid solution representing the ratio of the number of heteroatoms to the number of cations of the alkali metal, the temperature ($\theta[10^{-5}]$) indicated corresponding to the temperature for which the conductivity of the electrolyte constituted by the said solid solution is $10^{-5}$ ohms$^{-1}$.cm$^{-1}$.

Figure 2:
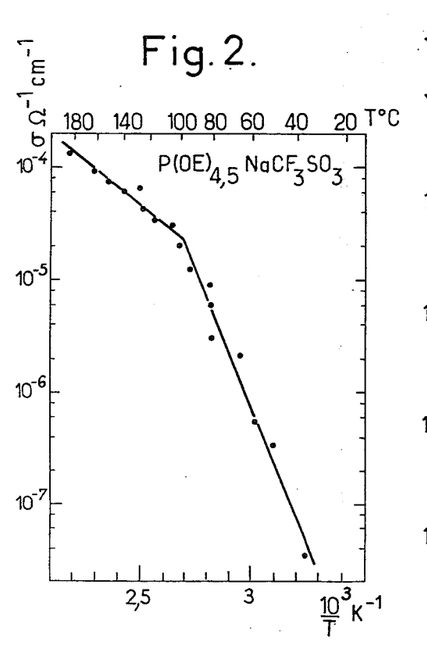
FIGS. 2 and 3 are illustrative of the variation in the electrical conductivity (expressed in $\Omega^{-1} \cdot cm^{-1}$) of certain solid electrolytes taken as examples, as a function of the temperature (expressed in °C. and/or by the reciprocal of the Kelvin temperature multiplied by $1000=(103)/(T) \, K^{-1}$).
Figure 3:
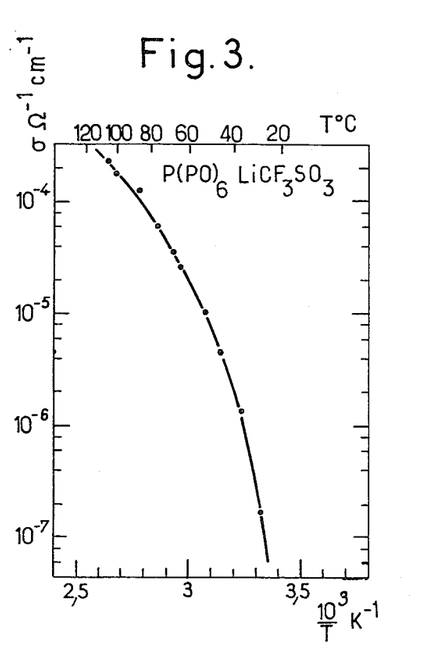

FIGS. 2 and 3 show variations, as a function of temperature, of the conductivities of two materials taken by way of example, notably PEO/Na$^+$CF$_3$SO$_3{}^-$ and PPO/Li$^+$CF$_3$SO$_3{}^-$, in which the ratios of the number of heteroatoms to the number of cations are respectively 4, 5 and 6. The absence of an observable transition point for the second of these materials will be noted, which absence is due to the amorphous character of the latter.

obtained under the same conditions. They have the composition characteristics indicated in the following table.

TABLE II

| Constituents of the solid solution | | Heteroatoms |
|---|---|---|
| Macromolecular constituent | Ionic constituent | cations |
| poly (glycidyl-methyl ether) | / Li$^+$ClO$_4{}^-$ | 6 |
| $-\!\!\left[\mathrm{CH}_2\!-\!\underset{\underset{\mathrm{CH}_2-\mathrm{O}-\mathrm{CH}_3}{\mid}}{\mathrm{O}}\right]\!\!-$ | / K$^+$SCN$^-$ | 10 |
| | / Na$^+$CF$_3$SO$_3{}^-$ | 6 |
| poly (N-methyl aziridine) | / Li$^+$ClO$_4{}^-$ | 6 |
| $-\!\!\left[\mathrm{CH}_2\!-\!\mathrm{CH}_2\!-\!\underset{\underset{\mathrm{CH}_3}{\mid}}{\mathrm{N}}\right]\!\!-$ | / Na$^+$CF$_3$SO$_3{}^-$ | 8 |
| poly (methoxy-ethoxy-ethyl-vinyl ether) | / Li$^+$ClO$_4{}^-$ | 9 |
| $-\!\!\left[\mathrm{CH}_2\!-\!\underset{\underset{\mathrm{O}-\mathrm{CH}_2-\mathrm{CH}_2-\mathrm{O}-\mathrm{CH}_2-\mathrm{CH}_2-\mathrm{O}-\mathrm{CH}_3}{\mid}}{\mathrm{CH}}\right]\!\!-$ | / K$^+$SCN$^-$ | 12 |
| | / Na$^+$CF$_3$SO$_3{}^-$ | 16 |

The conductivity of all these complexes measured at 80° C. is in all cases higher than $10^{-5}$ ohms$^{-1}$.cm$^{-1}$.

Also it is possible to produce numerous other solid solution of generators according to the invention, notably those applying, on the one hand, inorganic salts, such as defined above, on the other hand, macromolecular compounds, such as the following mentioned by way of additional examples: poly (glycidyl-ethoxy-ethyl ether)

poly (glycidyl-methoxy-ethoxy-ethoxy-ethyl ether)

poly (N methoxy-ethyl aziridine)

TABLE I

| Solid electrolyte | Heteroatoms/cations | $\theta$ [10$^{-5}$] |
|---|---|---|
| PEO/Li$^+$Br$^-$ | 4.5 | 150° |
| PEO/Na$^+$I$^-$ | 6 | 55° |
| PEO/Na$^+$I$^-$ | 4.5 | 50° |
| PEO/Li$^+$SCN$^-$ | 5 | 75° |
| PEO/Na$^+$SCN$^-$ | 4.5 | 45° |
| PEO/K$^+$SCN$^-$ | 4.5 | 60° |
| PEO/Rb$^+$SCN$^-$ | 4.5 | 35° |
| PEO/Cs$^+$SCN$^-$ | 8 | 25° |
| PEO/NH$_4{}^+$SCN$^-$ | 4 | 40° |
| PEO/Li$^+$BF$_4{}^-$ | 4.5 | 20° |
| PEO/Li$^+$CF$_3$CO$_2{}^-$ | 4.5 | 75° |
| PEO/Li$^+$CF$_3$SO$_3{}^-$ | 4.5 | 70° |
| PEO/Na$^+$CF$_3$SO$_3{}^-$ | 4.5 | 85° |
| PEO/Na$^+$CF$_3$SO$_3{}^-$ | 6 | 40° |
| PEO/K$^+$CF$_3$SO$_3{}^-$ | 4.5 | 40° |
| PEO/Li$^+$Br$^-$ | 6 | 125° |
| PPO/Li$^+$CF$_3$SO$_3{}^-$ | 6 | 85° |
| PPO/Na$^+$CF$_3$SO$_3{}^-$ | 10 | 65° |
| PPO/Na$^+$CF$_3$SO$_3{}^-$ | 14 | 70° |

EXAMPLE IV:

Other solutions using polymers belonging to each of the three previously mentioned categories have been

We claim:

1. Electrochemical generator for producing electrical current, comprising at least a negative electrode and at least a positive electrode separated from the negative electrode by means of a solid electrolyte, the negative electrode forming a "source" of material having a higher chemical potential, capable of supplying an alkali or ammonium cation at its interface with the electrolyte and the positive electrode forming a "well" at lower chemical potential for the non-ionized species corresponding to the above-said alkali cation, the electrolyte being of the type of those which enable the transfer of this alkali cation by ionic conduction from the negative electrode to the positive electrode, when the electrochemical reaction resulting from the production of current takes place, this generator comprising an electrolyte constituted at least in part by a solid solution of an ionic compound entirely dissolved within a solid, plastic macromolecular material and in which:

the ionic compound has the formula $M^+X^-$ in which M is a cation derivative of an alkali metal or from the ammonium ion, this cation corresponding at least in part to the cation supplied by the negative electrode at its interface with the electrolyte and $X^-$ is an anion of a strong acid, the said macromolecular material being constituted at least in part by a member of the group consisting of homopolymers and copolymers derivative of one or several monomers comprising at least one heteroatom notably oxygen or nitrogen, capable of forming donor-acceptor type bonds with the cation $M^+$.

2. Generator according to claim 1, wherein the above-said solid and plastic macromolecular material is also thermo-plastic and essentially constituted by non-cross-linked homopolymer or copolymer chains.

3. Generator according to claim 2 wherein the macromolecular material resorted to in the constitution of the above said solution is at least in part constituted by homo or copolymers containing chains comprising at least one heteroatom of oxygen or nitrogen, for four, preferably even for two atoms of carbon of the said chains, these heteroatoms either participating directly linked, but laterally to carbon atoms of a chain constituted by a homogeneous sequence of carbon atoms, in the ratio of one heteroatom to four, preferably to two carbon atoms.

4. Generator according to claim 3 wherein the macromolecular material of the solid electrolyte has a molecular weight higher than 50 000, preferably higher than 3 000 000.

5. Generator according to claim 4, wherein the ratio of the number of heteroatoms of the macromolecular material to the number of cations in the solid electrolyte is equal to or higher than 4, notably from 4 to 30.

6. Generator according to claim 2 wherein the ratio of the number of carbon atoms in the macromolecular material which is constituent of the electrolyte is comprised between 2 and 18, and preferably is 2 or 3.

7. Generator according to claim 6 wherein the anion of the compound $M^+X^-$ is an anion with delocalized charge, selected preferably from among the following:

$I^-$, $SCN^-$, $ClO_4^-$ $BF_4^-$, $PF_6^-$, $AsF_6^-$, $CF_3CO_2^-$, or $CF_3SO_3^-$, and that the cation is preferably $Li^+$ or $Na^+$.

8. Generator according to claim 1 wherein the electrodes and electrolytes are essentially anhydrous.

9. Generator according to claim 8 wherein the macromolecular material resorted to in the constitution of the above said solution is at least in part constituted by homopolymers or copolymers containing chains comprising at least one heteroatom of oxygen or nitrogen, for four, preferably even for two atoms of carbon of the said chains, these heteroatoms either participating directly linked, but laterally to carbon atoms of a chain constituted by a homogenous sequence of carbon atoms, in the ratio of one heteroatom to four, preferably to two carbon atoms.

10. Generator according to claim 9 wherein the macromolecular material of the solid electrolyte has a molecular weight higher than 50,000, preferably higher than 3,000,000.

11. Generator according to claim 10, wherein the ratio of the number of heteroatoms of the macromolecular material to the number of cations in the solid electrolyte is equal to or higher than 4, notably from 4 to 30.

12. Generator according to claim 9 wherein the ratio of the number of carbon atoms in the macromolecular material which is constituent of the electrolyte is comprised between 2 and 18, and preferably is 2 or 3.

13. Generator according to claim 12 wherein the anion of the compound $M^+X^-$ is an anion with delocalized charge, selected preferably from among the following:

$I^-$, $SCN^-$, $ClO_4^-$ $BF_4^-$, $PF_6^-$, $AsF_6^-$, $CF_3CO_2^-$, or $CF_3SO_3^-$, and that the cation is preferably $Li^+$ or $Na^+$.

14. Generator according to claim 1 wherein the macromolecular material resorted to in the constitution of the above said solution is at least in part constituted by homo or copolymers containing chains comprising at least one heteroatom of oxygen or nitrogen, for four, preferably even for two atoms of carbon of the said chains, these heteroatoms either participating directly in the formation of said chains, either being directly linked, but laterally, to carbon atoms of a chain constituted by a homogenous sequence of carbon atoms, in the ratio of one heteroatom to four, preferably to two carbon atoms.

15. Generator according to claim 14, wherein the macromolecular material of the solid electrolyte is a derivative of monomer units of the type represented: either by the following formula $$\left[ \begin{array}{c} CH_2-CH-O \\ | \\ R' \end{array} \right]$$

in which R' represents an hydrogen atom or one of the groups Ra, $-CH_2-O-Ra$, $-CH_2-O-Re-Ra$, $-CH_2-N=(CH_3)_2$, with Ra representing an alkyl or cycloalkyl radical comprising notably 1 to 16, preferably 1 to 4 carbon atoms, Re representing a polyether radical of the general formula $-(CH_2-CH_2-O)_p-$, p having a value from 1 to 100, notably from 1 to 2.

or by the following formula:

$$\left[ \begin{array}{c} CH_2-CH_2-N \\ | \\ R'' \end{array} \right]$$

in which R'' represents Ra, $-Re-Ra$, with Ra and Re having respectively one of the above-indicated meanings, or by the following formula:

$$\left[ \begin{array}{c} CH_2-CH \\ | \\ O-Re-Ra \end{array} \right]$$

in which Ra and Re have respectively one of the above-indicated meanings.

16. Generator according to claim 15, wherein the macromolecular material is a poly(ethylene oxide).

17. Generator according to claim 14, wherein the macromolecular material of the solid electrolyte is an elastomer, amorph, isotrop material, derivative of monomeric units of the type represented by:
either by the following formula in which R' represents one of the groups Ra, —CH$_2$—O—Ra, —CH$_2$—O—Re—Ra, —CH$_2$—N=(CH$_3$)$_2$, with Ra representing an alkyl or cycloalkyl radical comprising notably 1 to 12, preferably 1 to 4 carbon atoms, Re representing polyether radical of the general formula —(CH$_2$—CH$_2$—O)$_p$—, p having a value from 1 to 10,
or by the following formula:

in which R" represents Ra, —Re—Ra, with Ra and Re having respectively one of the above-indicated meanings,
or by the following formula:

in which Ra and Re having respectively one of the above indicated meanings.

18. Generator according to claim 17, wherein the macromolecular material of the solid electrolyte is constituted by poly(propylene oxide).

19. Generator according to claim 14, wherein the said solid and plastic macromolecular material is also thermo-plastic and essentially constituted by non-cross-linked homopolymer or copolymer chains and that its electrodes and electrolytes are essentially anhydrous.

20. Generator according to claim 19 wherein the macromolecular material of the solid electrolyte has a molecular weight higher than 50,000, preferably higher than 3,000,000.

21. Generator according to claim 20, wherein the ratio of the number of heteroatoms of the macromolecular material to the number of cations in the solid elctrolyte is equal to or higher than 4, notably from 4 to 30.

22. Generator according to claim 1, 2, 8, 14, 15, 16, 17, or 18, wherein the macromolecular material of the solid electrolyte has a molecular weight higher than 50,000, preferably higher than 3,000,000.

23. Generator according to claim 1, 2, 8, 14, 15, 16, 17, or 18, wherein the ratio of the number of heteroatoms of the macromolecular material to the number of cations in the solid electrolyte is equal to or higher than 4, notably from 4 to 30.

24. Generator according to claim 1, 2, 8, 14, 15, 16, 17, or 18, wherein the ratio of the number of carbon atoms in the macromolecular material which is a constituent of the electrolyte is comprised between 2 and 18, and preferably is 2 or 3.

25. Generator according to claim 1, 2, 8, 14, 15, 16, 17, or 18, wherein the anion of the compound M$^+$X$^-$ is an anion with delocalized charge, selected preferably from among the following:

and that the cation is preferably Li$^+$ or Na$^+$.

26. Generator according to claim 1, 2, 8, 14, 15, 16, 17, or 18, wherein the anion of the ionic compound is selected from the following anions:

and the cation from among the following cations:
Li$^+$, Na$^+$, K$^+$ or NH$_4^+$.

27. Generator according to claim 1, 2, 8, 14, 15, 16, 17, or 18, wherein the anion of the ionic compound is:

and the cation is Rb$^+$ or Cs$^{30}$.

28. Generator according to claim 1, 2, 8, 14, 15, 16, 17, or 18, wherein the ionic compound M$^+$X$^-$ of the solid electrolyte is selected from among the following compounds:

29. Generator according to claim 1, 2, 8, 14, 15, 16, 17, or 18, wherein the electrolyte contains, moreover, incorporated in its mass, at least another constituent having a conduction which is exlusively ionic.

30. Generator according to claim 29, wherein the electrolyte is constituted by a substantially homogenous agglomerated composite mass, of the above-said solid solution and at least by an inorganic compound with exclusively ionic conduction in the state of particles, whose granulometries are notably of about 1 to 500 microns, the proportion by weight of the inorganic compound with respect to the weight of the electrolyte being preferably comprised between about 50 and about 90%.

31. Electrochemical generator according to claim 1, 2, 8, 14, 15, 16, 17, or 18, wherein the negative electrode is constituted by a compound such as an alkali metal, an intermetallic compound, an alloy, an insertion compound of the like, capable of liberating alkali cation M$^+$ identical to the one of the electrolyte and by the fact that the positive electrode is constituted by a material containing a compound derived from a transition metal, notably of the type of the salt of this metal type, or intercalary compound of one salt of this metal, which enables the diffusion of the atoms of an alkali metal into its structure.

32. Generator according to claim 1, 2, 8, 14, 15, 16, 17, or 18, wherein at least one of the electrodes is constituted by agglomerated electrode material, notably of the active matter of the latter.

33. Generator according to claim 32, wherein the active matter and the inert compounds with electrical conduction are in weight proportion which is preferably not higher than 25% in weight of the concerned electrode, and by the fact that they are in the state of particles, the granulometry of which is preferably comprised between about 1 and 500 microns.

34. Generator according to claim 32 or 33, wherein the electrolyte and the electrodes are constituted by a stacking of thin sheets of corresponding materials which are formed by rolling or the like.

35. Generator according to claim 32, 33 or 34, wherein the above-said solid solution extends in a substantially continuous way from the electrolyte towards and into the one of the electrodes which are associated with it, which is formed of the above-said composite mass.

36. Generator according to claim 1, 2, 8, 14, 15, 16, 17, or 18, wherein the elements of generator, constituted by electrolyte sheets or films having a thickness between 0.01 and about 0.2 mm, in alternance with electrode sheets or films having a thickness from 0.1 to 0.5 mm.

37. Generator according to claim 32, wherein at least one of the electrodes is constituted by an inert compound with electrical conduction, on the one hand, and by the above-said monophased solution, on the other hand.

* * * * *